(12) United States Patent
Musselman

(10) Patent No.: US 8,209,842 B2
(45) Date of Patent: Jul. 3, 2012

(54) METHOD OF MANUFACTURING A TRACTION STUD MOUNT

(76) Inventor: Robert S. Musselman, Midland, MI (US)

( * ) Notice: Subject to any disclaimer, the term of this patent is extended or adjusted under 35 U.S.C. 154(b) by 0 days.

(21) Appl. No.: 12/806,685

(22) Filed: Aug. 19, 2010

(65) Prior Publication Data

US 2010/0313406 A1    Dec. 16, 2010

(51) Int. Cl.
    *B21D 39/02*      (2006.01)
(52) U.S. Cl. ...... 29/428; 29/525.01; 403/282; 72/379.2; 305/167
(58) Field of Classification Search .......... 29/516, 29/517, 520, 522.1, 523, 525, 525.01, 525.02, 29/428; 403/282; 305/167, 179; 72/379.2
See application file for complete search history.

(56) References Cited

U.S. PATENT DOCUMENTS

| | | | | |
|---|---|---|---|---|
| 5,181,747 A | * | 1/1993 | Jovero | 285/21.1 |
| 5,685,621 A | * | 11/1997 | Nugent | 305/180 |
| 6,035,516 A | * | 3/2000 | Petersen | 29/523 |
| 6,264,293 B1 | | 7/2001 | Musselman et al. | |
| 6,264,294 B1 | | 7/2001 | Musselman et al. | |
| 6,892,435 B2 | * | 5/2005 | Cattaneo | 29/525 |
| 2004/0074096 A1 | * | 4/2004 | Cattaneo | 29/897 |

FOREIGN PATENT DOCUMENTS

GB      2144822 A    *    3/1985

* cited by examiner

*Primary Examiner* — Jermie Cozart
(74) *Attorney, Agent, or Firm* — Robert L. McKellar; McKellar IP Law, PLLC

(57) ABSTRACT

A stud mount for detachably mounting a traction stud to a snowmobile track assembly including an endless drive belt having at least one laterally extending reinforcing rod embedded in the drive belt. At least one stud mount is secured about the reinforcing rod by way of a mounting head and is opened to the ground-engaging side of the track to receive a traction stud. One or more stabilizing arms project laterally from the mounting head and are adapted embedded in the endless drive belt to provide lateral stability to the stud mounts under torque load.

6 Claims, 3 Drawing Sheets

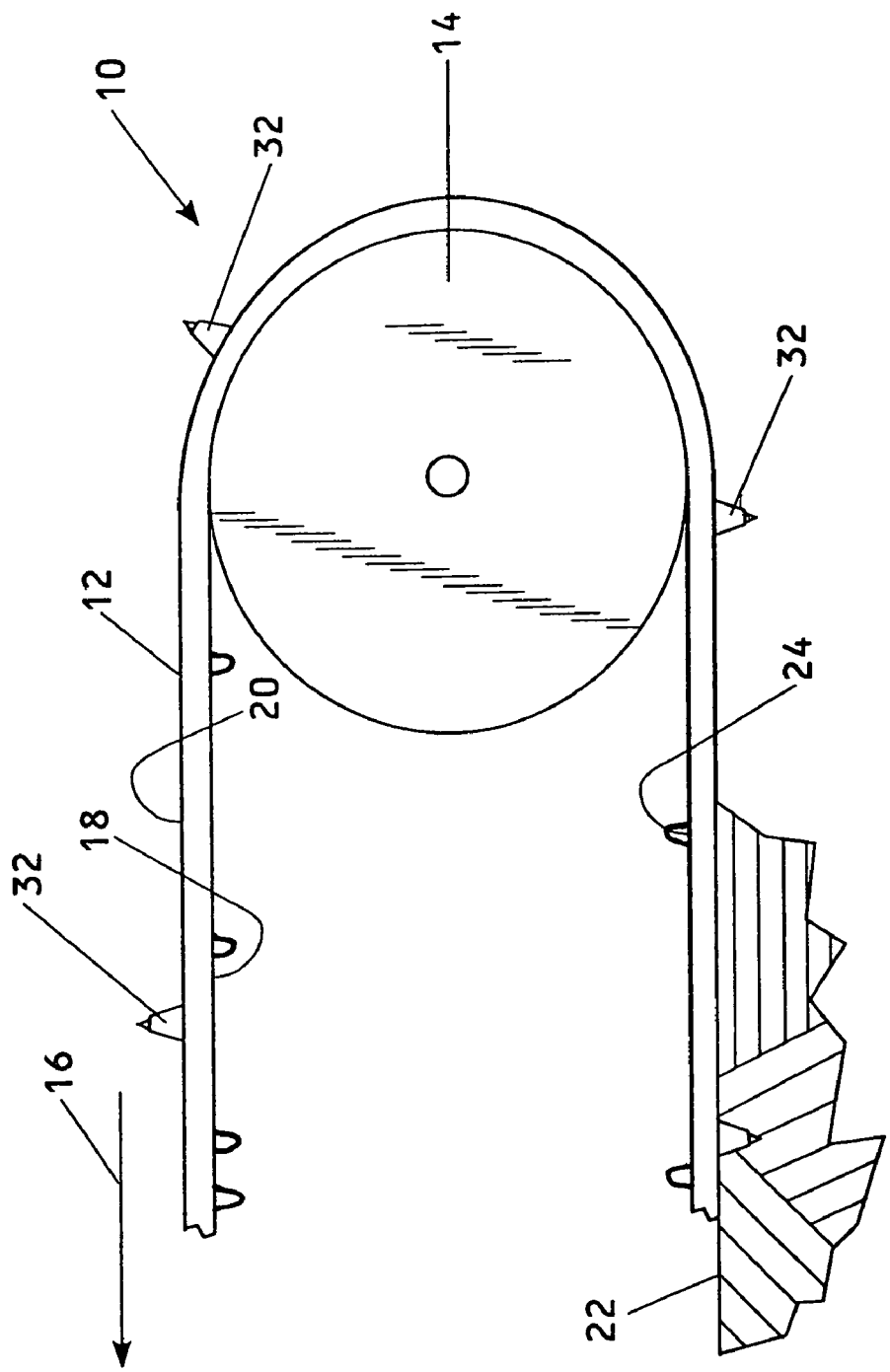

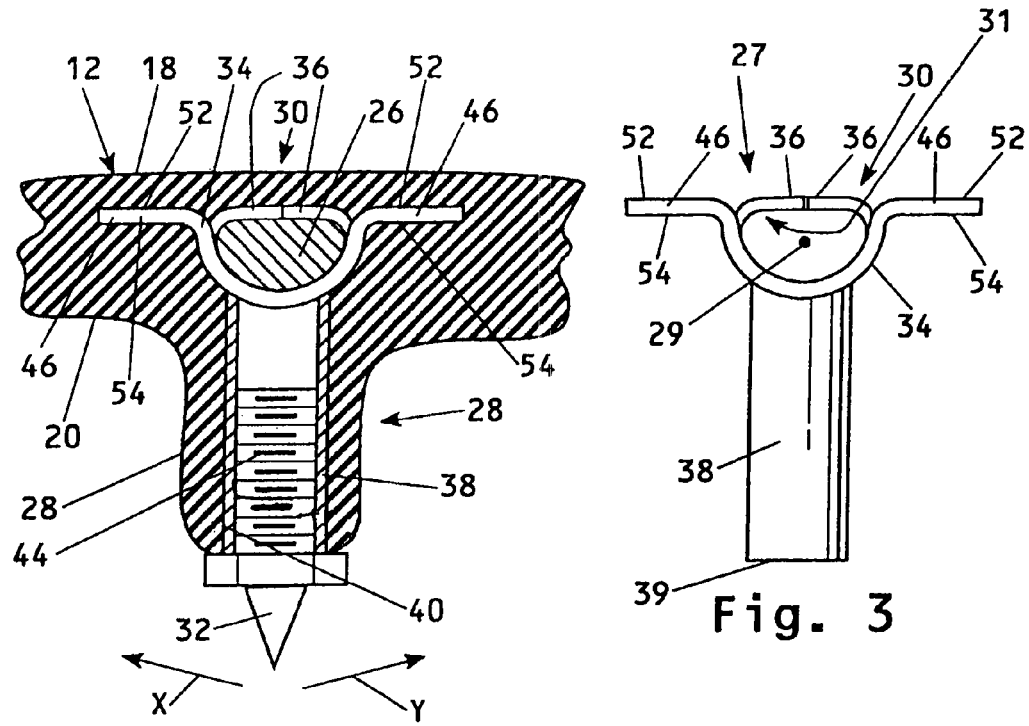

METHOD OF MANUFACTURING A TRACTION STUD MOUNT

This application claims priority from U.S. patent application Ser. No. 11/219,362 filed Sep. 6, 2005 now U.S. Pat. No. 7,845,741 B2.

BACKGROUND OF THE INVENTION

1. Technical Field

This invention relates generally to a traction stud mount and method of making same, and more particularly to the construction, manufacture and mounting of the supports for traction studs on a snowmobile drive track.

2. Related Art

A snowmobile is a motor driven machine which is propelled by an endless drive track typically formed of resilient material, such as rubber. Such tracks are commonly outfitted with metal studs in order to improve the traction on ice and packed snow.

U.S. Pat. Nos. 6,264,293 and 6,264,294 disclose a stud mount for mounting the studs on an endless drive track wherein the stud receptor or mount is embedded in the track and includes a hollow transverse mounting head which extends about a reinforcing bar that is also embedded in the track. The receptor opens to the outer ground-engaging side of the track and is internally threaded for receiving a stud. Securing the stud mounts to the reinforcing bars of the track has the advantage of providing a relatively firm mounting and support of the studs relative to, the track. However, under heavy loading, such as sudden acceleration or sharp turning at higher speeds, side loads imparted on the studs have a tendency to torque the studs either fore or aft of the reinforcing bar, such that the maximum traction may be impaired under certain operating conditions.

SUMMARY OF THE INVENTION AND ADVANTAGES

A traction stud mount, according to one aspect of the invention, is particularly adapted for use on a snowmobile track assembly comprising an endless drive belt having an inner surface and an outer ground-engaging surface and at least one laterally extending reinforcing rod embedded in the drive belt. At least one stud mount, which is adapted to be at least partially embedded in the drive belt extends between a stud-receiving end for communicating with the outer ground-engaging surface and receiving a traction stud therein, and an opposite mounting head adapted to be secured directly to the reinforcing rod. The traction stud mount includes at least one transverse stabilizing arm projecting laterally outwardly of the mounting head and adapted to be embedded in the drive belt to provide lateral support to the stud mount. An aspect of the invention comprises a method of manufacturing the stud mount and a snowmobile drive track incorporating same.

An advantage of the invention is that the stabilizing feature of the stud mount enhances the lateral support and stability of the stud mount on the drive track. This added stability helps maintain a desired alignment of the mounting stud relative to the track during operation and particularly under severe lateral loads such as during sudden acceleration, braking and turning maneuvers which would tend to impart lateral tipping loads on the studs. The stabilizing features spread the loads imparted to the stud and stud mount over a greater area of the belt thereby increasing the support for the stud mount. Maintaining proper alignment has the further advantage of enhancing the performance of the drive belt by maintaining the studs in a desired orientation relative to the snow or ice terrain on which the belt is driven to achieve maximum traction from the studs.

A further advantage of the invention is that the transverse stability features decrease the concentration of the stress and wear on the drive belt by distributing the forces over a greater area and thus reducing concentrated loading regions on the belt at the base of the stud mount, thereby increasing the longevity of the drive belt.

BRIEF DESCRIPTION OF THE DRAWINGS

These and other features and advantages of the present invention will become more readily appreciated when considered in connection with the following detailed description and appended drawings, wherein:

FIG. 1 is a fragmentary side elevation view, partly in section, of an endless drive track fitted with stud mounts;

FIG. 2 is a greatly enlarged fragmentary sectional side view of the track assembly more particularly illustrating the stud mount mounting a traction stud on an imbedded reinforcing bar;

FIG. 3 is a greatly enlarged side elevation view of the embodiment of the stud mount illustrated in FIG. 2;

FIG. 4 is an end elevation view of the stud mount shown in FIGS. 2 and 3;

FIGS. 5 and 6 are bottom and top views, respectively, of the stud mount illustrated in FIGS. 2 through 4;

DETAILED DESCRIPTION OF THE PREFERRED EMBODIMENT

Figure 7:
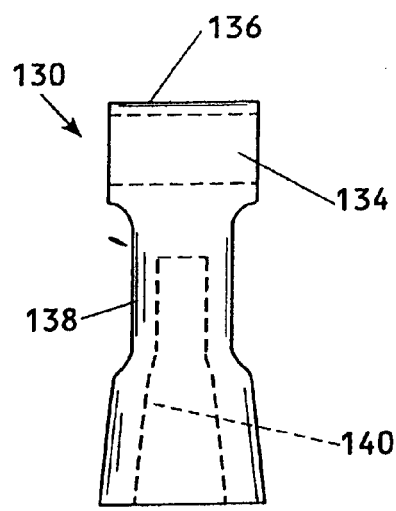
FIGS. 7 and 8 are end and side views, respectively, of a slightly modified stud mount according to an alternative embodiment of the invention.

A snowmobile track assembly constructed according to an embodiment of the invention is shown generally at 10 in FIG. 1 and includes an endless drive belt 12 trained around at least a pair of drive sprockets or wheels, one of which is illustrated at 14, for driving the belt 12 in an endless path represented by the arrow 16. The endless belt 12 may suitably be molded from flexible or resilient material, such as rubber, having a plurality of longitudinally extending polyester cords embedded therein to strengthen the track and may further include inner and/or outer cloth layers disposed on the inner and outer sides of the polyester cords to sandwich the cords there between as described, for example, in U.S. Pat. No. 6,264,293 which is commonly owned by the assignee of the present invention and the entirety of its disclosure and teachings incorporated herein by reference.

The belt 12 includes an inner face 18 and an outer face 20 which, as it passes along the lower run of the belt, engages a surface 22 to be traversed. The surface 22 may typically be packed snowed, ice, or other terrain along which snowmobile drive tracks are typically used to propel the vehicle. The term "snowmobile" is not intended to limit the invention to any particular use in connection with operating the vehicle or track assembly in the snow, but is understood to generally describe this basic type of vehicle in which an endless drive belt is used to propel a sled or other framework on which the driver is carried. Likewise, the endless belt is not intended to be limited to any particular material, and it is intended to cover the types of endless drive belt constructions and systems that are employed to propel these types of vehicles. As such, the invention contemplates that the construction and materials for the endless belts may change over time and that the invention is not to be limited to any particular material or construction.

The inner track surface 18 may be formed with a plurality of longitudinally spaced drive lugs 24 which are spaced along the length of the inside of the belt 12 for engaging the drive wheels 14 in the usual manner. The belt 12 may include a plurality of belt sections, as described in U.S. Pat. No. 6,264,294 which is also assigned to the assignee of the present invention and its descriptions and teachings incorporated herein by reference, including further details concerning one possible construction of the endless belt that may be used in connection with the present invention, although not limited to such a belt construction.

Embedded in the belt 12 and spanning a substantial width of the belt 12 is a plurality of longitudinally spaced apart, transversely extending reinforcing rods or bars 26. These rods 26 present a relatively rigid backbone or structure in the flexible belt assembly. However, since the rods 26 are relatively narrow, spaced apart and extend crosswise to the direction of endless travel 16 of the belt, they do not substantially interfere with the flexibility and drive of the belt 12 around the drive wheel 14.

The outer track surface 20 presents a plurality of spaced apart rows of transversely extending tractions lugs 28 that are integrally formed with the drive belt 12 and engage the surface 22 for increasing traction of the drive belt 12, particularly in snowy conditions. One of the reinforcing rods 26 is disposed in alignment with each of the lugs 28.

The drive belt 12 is fitted with at least one stud mount 30 constructed according to the present invention and may be fitted with a plurality of such stud mounts 30 aligned with each of the spaced apart rows of traction lugs 28 about the outer face 20 of the belt 12. At least some of the stud mounts 30 may be provided in at least some of the traction lugs 28 as illustrated, for example, in FIG. 2. The stud mounts 30 may be molded in place with the formation of the belt 12 and at least one or more of the stud mounts 30 may further directly engage one or more of the reinforcement rods 26, as also illustrated in FIG. 2. The stud mount 30 presents a receptacle at a stud receiving end 39 which is open to the ground-engaging side of the belt for receiving an associated traction stud 32 therein for enhancing the tractions of the drive belt 12.

The general construction of the drive belt assembly 12 thus far described is conventional as shown, for example, in the previously incorporated U.S. Pat. No. 6,264,294.

Turning back to FIGS. 2-6, it will be seen that the stud mount 30 includes a transversely disposed mounting head portion 34 that operates to fix the stud mount 30 to the reinforcement rod 26. In the illustrated embodiment, the mounting head 34 is in the form of a contoured metal sheet structure disposed on the outer face of the reinforcing bar 26 and having centrally disposed leg or strip portions 36 which wrap around the inner face of the reinforcement rod 26 and cooperate to form a hollow transverse body 27, having an axis 29, defining a central opening 31 to secure the stud mount 30 firmly to the reinforcement rod 26. When the rubber belt material is molded about the reinforcement rods 26, the mounting head 34 of the stud mount 30 becomes embedded in the belt along with the reinforcement rods 26 and becomes a permanent, non-removable component with the belt assembly 12.

The stud mount 30 also includes a generally tubular, elongate, stud mounting member or barrel projecting longitudinally from the mounting head 34 toward and open to the outer face or terminal end 44 of the lug 28 of the belt 12. The tubular member 38 may comprise an extruded steel cylinder, having a longitudinal axis 37, defining a receptacle or opening 40 into which the traction stud 32 is installed. The receptacle 40 is suitably shaped to receive and hold the traction stud 32 firmly but removably in the receptacle 40. For example, the receptacle 40 may be formed with internal threads which mate with external threads 44 of the traction stud for securely but removably mounting the traction stud 32. It will be seen in FIG. 2 that the tubular member 38 becomes substantially embedded in the rubber material of the belt 12 during molding of the belt, and may be advantageously located in one of the traction lugs 28 of the belt 12, as shown in FIG. 2. The tubular member 38 is preferably fixed to the mounting head 34 in such a way that the tubular member 38 is firmly anchored to the associated reinforcement rod 26 through the mounting head 34. The tubular member 38 may be separately formed from the mounting head 34 and subsequently fixed to the mounting head 34, such as by welding or the like. The tubular member 38 may be made of the same or different material than that of the mounting head 34. The mounting head 34 and tubular member 38 may be made of metal, plastic, or other suitable material. A tubular member 38 made of metal is advantageous in that its screw threads would be strong enough to hold the mating screw threads of the traction stud 32, although the invention is not limited by the selection of material. It will be noted that the longitudinal axis 37 is perpendicularly disposed to the transverse axis 29.

The stud mount 30 is provided with at least one transverse stabilizing arm 46 that projects laterally outwardly relative to the axis 29 of the hollow body 27 and the reinforcing rod 26 on which the mounting head 34 is secured and which is embedded in the endless drive belt 12 to provide lateral support to the stud mount 30. The stabilizing arm 46 extends in the direction of endless travel 16 of the drive belt 12. The stabilizing structure may extend from both sides of the hollow body 27 and the reinforcing rod 26, and as such the invention may include more than one stabilizing arm 46. As shown best in FIGS. 2, 3, 5 and 6, the stabilizing arms 46 may extend in opposite directions from the integrally formed hollow body 27 and the reinforcing rod 26 and may be formed as one piece with the mounting head 34 of the same material. In the illustrated embodiment, the mounting head 34 is fabricated from a piece of bent metal plate material that is contoured in the middle to conform with the cross-sectional shape of the reinforcing rod 26 and is advantageously non-circular to lend some lateral stability to the stud mount 30 and to prevent it from rotating relative to the reinforcing rod 26. As shown best in FIGS. 2 and 3, it will be seen that the contoured section of the hollow body 27 may be generally D-shaped to conform to the generally D-shaped cross section of the reinforcing rod 26 that may be employed. The invention is not limited to any particular shape and may include round cross sections, although there are advantages realized by non-circular cross sections.

Referring to the same figures, it will be seen that the central leg portions 36 may comprise strap-like portions and that a pair of such strap portions constituting the leg portions 36 may be bent around the reinforcing rod 26 such that the hollow body 27 formed thereby substantially surrounds the reinforcing rod 26. The stabilizing arms 46 are disposed on opposite sides of each of the leg portions 36 and extend in the opposite direction as that of the adjoining leg portions 36 on opposite sides of the reinforcing rods 26. In other words, while the leg portions 36 extend toward one another to wrap about the reinforcing rod 26, the stabilizing arms 46 extend in opposite directions away from one another on opposite sides of the hollow body 27 and the reinforcing rod 26 to increase the effective size or base of the mounting head 34 to enhance stability and retention of the stud mount 30. As illustrated, the stabilizing arms 46 are integral with and cantileverly supported by the leg portions 36 and present wing-like features that are formed as one piece with the mounting head 34. The strap-like leg portions 36 may be cut out of these wing portions as shown best in FIGS. 4 and 5, such that the outwardly projecting strap portions that make up the stabilizing arms 46 may include four such stabilizing strap portions 48, with a set of two such strap portions extending from opposite sides of the reinforcing rods 26 separated by a gap 50 from which the leg portion straps 36 are cut and formed to shape. The stabilizing arms 46 have opposite surfaces 52, 54 which are embedded in and engaged by the endless drive belt material 12, as best shown in FIG. 2.

In use, when the endless drive belt 12 is subjected to sudden acceleration or stopping maneuvers, it causes the studs 32 to bite into the surface 22 and the reaction forces can impose a fore or aft load on the stud 32 and thus the stud mount 30 causing it to be torqued fore or aft, in the directions of the arrows X and Y, about the axis 29 and the reinforcing rod 26 (e.g., to the left or right as seen in FIG. 2). While the engagement of the mounting head 34 about the reinforcing rod 26 provides significant support to counteract and inhibit swinging movement of the stud mount 30 about the transverse axis 27, the provision of the stabilizing arms 46 greatly enhances the support by effectively enlarging the support base of the mounting head 34. In particular, when a torque load is imparted to the stud mount in either the fore or aft direction, it will urge the stud mount 30 to rock about the axis 29 in one direction or the other represented by the arrows X and Y. Since the opposite surfaces 52, 54 of the stabilizing arms are fully embedded in the drive belt 12, the torque loads will be distributed through the stabilizing arms and into the endless belt material across the wide contact area between the stabilizing arms 46 and the belt material to greatly resist any movement of the stud mount 30 relative to the drive belt 12.

Figure 8:
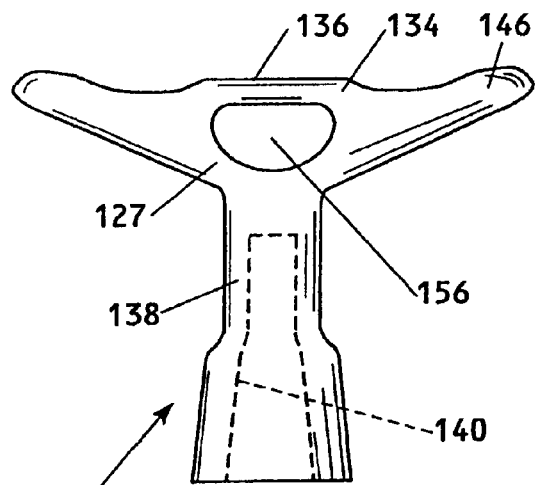

FIGS. 7 and 8 illustrates an alternative embodiment of the stud mount 130. The same reference numerals are used to designate the same or like features, but are offset by one hundred in relation to the first embodiment of FIGS. 2-6. The stud mount 130 may be formed entirely of one piece, such as by casting or molding, and may be fabricated of metal or plastics material or a combination thereof. In this embodiment, the mounting head 134, tubular body 127, tubular member 138 and stabilizing arms 146 are all formed of one piece, as are the leg portions 136. This stud mount 130 may be disposed on the reinforcing rod (not shown, but which may be the same as that illustrated in the first embodiment) by aligning a central opening 156 of the stud mount 130 with an end of the reinforcing rod and then sliding the stud mount 130 in position on the rod prior to molding the drive belt about the reinforcing rod and stud mount 130. The same technique can be used to mount the stud mount 30 of the first embodiment or, alternatively, the leg portions 36 can be bent into position around the reinforcing rod 26. The stud-receiving end of the tubular member 138 is formed with an opening to define a receptacle 140 into which a traction stud can be mounted in manner that will secure the stud within the stud mount 130. The reinforcing rod and stud mounts are then overmolded by the belt material in the manufacture of the belt 12.

Figure 9:
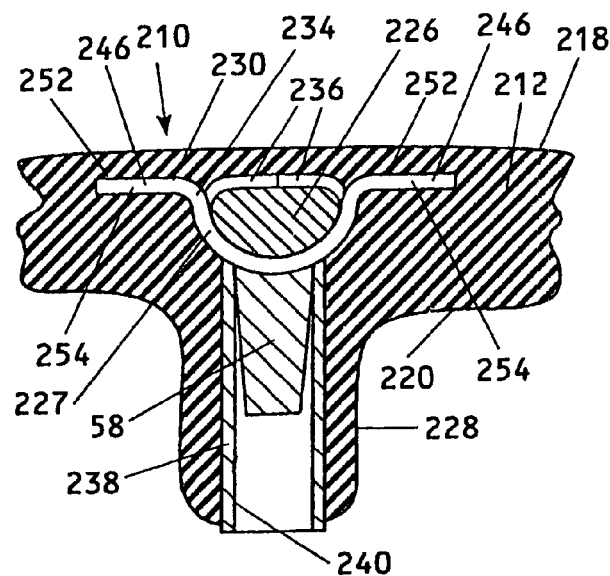
FIG. 9 is a view similar to, but of still a further embodiment of the stud mount.
Figure 10:
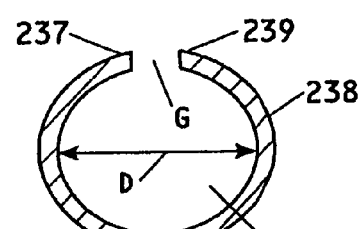
FIGS. 10 and 11 are cross-sectional views of a tubular stud-receiving portion of the stud mount of FIG. 9 illustrated in the pre and post-formed stages.
Figure 11:
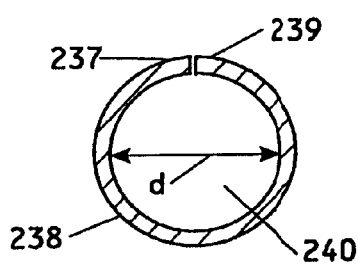

FIGS. 9 through 11 illustrate another alternative embodiment that is similar in construction to that of the first embodiment but is particularly adapted for drive belts 212 including longer lugs 228. The same reference numerals are used to designate the same or like features in connection with the first embodiment, but are offset by 200. As illustrated, the stud mount 230 has the same mounting head construction 234, including the leg portions 236 forming the hollow body 227 and the stabilizing arms 246. The tubular member 238 may be formed from rolled steel or the like as illustrated in FIGS. 10 and 11 in the general manner of a roll pin. The tubular member 238 is fabricated from a generally flat sheet of steel having distal ends 237 and 239 which are initially spaced apart but as the sheet is rolled to the cylindrical position disposed in FIG. 11, the distal ends 237 and 239 are disposed in confronting and/or abutting relation. The cylinder illustrated in FIG. 11 is illustrated as having a breath or diameter d. The hollow body 227 of the mounting head 234 is fitted with a tapered or frustoconical pin or peg 58 to assist in aligning and radially expanding the tubular member 238 relative to the mounting head 234 during the assembly and welding of the tubular member 238 to the mounting head 234. The tubular member 238 is axially aligned with the tapered cone or peg 58 and then axially moved over the peg between a removed position, in a direction toward and in abutting relation with the outer portion of the tubular body 227 of the mounting head 234. At its inner end, the peg 58 has a breadth or diameter larger than the breadth d so that the adjacent ends 237 and 239 are spread apart and tubular member 238 will radially outwardly expand as it moves axially inwardly to the abutting position illustrated in FIG. 9 to increase the breadth of cylinder 238 to an increased breadth or diameter D. During this expansion, the terminal or distal ends 237 and 239 are moved spaced apart from each other to forming a gap G. This feature will allow expansion to any selected one of a plurality of breadths D to accommodate studs of differing diameters. The tubular member 238 may be internally threaded to receive a traction stud as with the first embodiment.

Obviously, many modifications and variations of the present invention are possible in light of the above teachings. It is, therefore, to be understood that within the scope of the appended claims, the invention may be practiced otherwise than as specifically described.

What is claimed is:

1. A method of making a traction stud mount for a drive track having at least one reinforcing rod embedded in said belt, said method including the steps of:
    forming a mounting head having a passage therethrough, with a first axis, for receiving the reinforcing rod, said mounting head being fitted with a frustoconical pin;
    forming a stud receiving cylinder having an opening therein with a second axis;
    radially outwardly expanding the breadth of said opening while concurrently moving said stud receiving cylinder toward said mounting head with said second axis being disposed transversely to said first axis from a position removed from said head to an abutting position abutting said head; and
    fastening said stud receiving cylinder in said abutting position to said mounting head.

2. A method of fabricating an endless drive track for a snowmobile, comprising:
    preparing at least one reinforcing rod;
    preparing at least one stud mount having an inner mounting head having a hollow body fitted with a tapered or frustoconical pin or peg, an outer stud-receiving end, and at least one transverse stabilizing arm projecting laterally outwardly of the stud mount;
    securing the mounting head of the traction stud mounting device to the reinforcing rod; and
    embedding at least one end and at least a part of the at least one traction stud mounting device in an endless band of resilient material with said at least one transverse stabilizing arm being embedded in the resilient material to provide lateral stability to the traction stud mounting device.

3. A method of manufacturing a traction stud mount comprising the steps of forming a hollow mounting head having a first opening with a first axis; and attaching a traction stud receiving elongate stud receiving receptacle, having an axis transverse to said first axis, to said hollow mounting head, wherein said attaching step includes the step of forming a hollow tubular member and thereafter attaching said tubular member to said mounting head, wherein the step of forming said hollow tubular member is accomplished by rolling a sheet of metal having distal ends from a laid out position in which the distal ends are spaced apart to a rolled position having a first predetermined breadth and said distal ends are in abutting relation.

4. The method of manufacturing set forth in claim 3 wherein said step of attaching said tubular member is accomplished by mounting a transversely extending guide peg to one side of said head and thereafter axially driving said tubular member over said guide peg to force said distal ends from the abutting relation to a slightly spaced apart relation to concurrently expand the breadth of said tubular member to a greater predetermined breadth.

5. The method of manufacturing set forth in claim 3 in which the step of attaching said tubular member to said mounting head is accomplished by relatively moving said tubular member and said mounting head toward said each other while concurrently radially outwardly expanding the breadth of said tubular member from said predetermined breadth to a greater predetermined breadth.

6. The method of manufacturing set forth in claim 5 wherein said step of radially outwardly expanding the breadth of said tubular member is accomplished by relatively moving said tubular member and a cone shaped expansion peg toward each other as said mounting head and said tubular member are relatively moving toward each other.

* * * * *